United States Patent
Defreitas et al.

(10) Patent No.: US 12,484,870 B2
(45) Date of Patent: Dec. 2, 2025

(54) SYSTEMS AND METHODS FOR MEASURING THICKNESS OF FOAM COMPRESSIVE ELEMENTS

(71) Applicant: Hologic, Inc., Marlborough, MA (US)

(72) Inventors: Kenneth F. Defreitas, Patterson, NY (US); Baorui Ren, Andover, MA (US)

(73) Assignee: Hologic, Inc., Marlborough, MA (US)

( * ) Notice: Subject to any disclaimer, the term of this patent is extended or adjusted under 35 U.S.C. 154(b) by 106 days.

(21) Appl. No.: 18/556,153

(22) PCT Filed: Apr. 26, 2022

(86) PCT No.: PCT/US2022/026336
§ 371 (c)(1),
(2) Date: Oct. 19, 2023

(87) PCT Pub. No.: WO2022/232137
PCT Pub. Date: Nov. 3, 2022

(65) Prior Publication Data
US 2024/0180509 A1  Jun. 6, 2024

Related U.S. Application Data

(60) Provisional application No. 63/179,816, filed on Apr. 26, 2021.

(51) Int. Cl.
A61B 6/00 (2024.01)
A61B 6/04 (2006.01)
A61B 6/50 (2024.01)

(52) U.S. Cl.
CPC ............ *A61B 6/502* (2013.01); *A61B 6/0414* (2013.01); *A61B 6/0421* (2013.01); *A61B 6/542* (2013.01); *A61B 6/545* (2013.01)

(58) Field of Classification Search
CPC ....... A61B 6/501; A61B 6/502; A61B 6/0414; A61B 6/0421; A61B 6/0435;
(Continued)

(56) References Cited

U.S. PATENT DOCUMENTS 3,578,971 A   5/1971  Lasky
3,971,950 A   7/1976  Evans et al.
(Continued)

FOREIGN PATENT DOCUMENTS

AU   2008201638   5/2008
CN      1586399   3/2005
(Continued)

OTHER PUBLICATIONS

Digital Clinical Reports, Tomosynthesis (GE Brochure 98-5493, Nov. 1998), 8 pgs.
(Continued)

*Primary Examiner* — Don K Wong
(74) *Attorney, Agent, or Firm* — Merchant & Gould P.C.

(57) ABSTRACT

A method of imaging a breast of a patient with a breast imaging system includes supporting the breast on a breast support platform. A compressive force is applied to the breast with a breast immobilization element including a rigid substrate, a foam compressive element secured below the rigid substrate, and a force sensor. The foam compressive element is in contact with the breast during application of the compressive force. A force signal is detected at the force sensor based on the applied compressive force. A compressed thickness of the breast proximate the force sensor is determined based at least in part on the detected force signal at the force sensor. An automatic exposure control is set based at least in part on the determined thickness of the breast proximate the force sensor.

19 Claims, 10 Drawing Sheets

(58) Field of Classification Search
CPC ............ A61B 2562/0247; A61B 5/708; A61B 5/7232; A61B 5/4312; A61B 5/681; A61B 6/54; A61B 6/542; A61B 6/545
See application file for complete search history.

(56) References Cited

U.S. PATENT DOCUMENTS

| | | | |
|---|---|---|---|
| 4,496,557 | A | 1/1985 | Malen |
| 4,567,899 | A | 2/1986 | Kamens et al. |
| 4,943,986 | A | 7/1990 | Barbarisi |
| 4,962,515 | A | 10/1990 | Kopans |
| 5,040,198 | A | 8/1991 | Hixson, Sr. |
| 5,051,904 | A | 9/1991 | Griffith |
| 5,107,255 | A | 4/1992 | Shiraishi |
| 5,109,398 | A | 4/1992 | Hunt |
| 5,199,056 | A | 3/1993 | Darrah |
| 5,257,121 | A | 10/1993 | Steinberg |
| 5,359,637 | A | 10/1994 | Webber |
| 5,398,272 | A | 3/1995 | Bouscary et al. |
| 5,474,072 | A | 12/1995 | Shmulewitz |
| 5,506,877 | A | 4/1996 | Niklason |
| 5,553,111 | A | 9/1996 | Moore et al. |
| D376,012 | S | 11/1996 | Hixson, Sr. |
| 5,706,327 | A | 1/1998 | Adamkowski |
| 6,049,583 | A | 4/2000 | Galkin |
| 6,122,542 | A | 9/2000 | Lee |
| 6,289,235 | B1 | 9/2001 | Webber |
| 6,577,702 | B1 | 6/2003 | Lebovic et al. |
| 6,587,578 | B2 | 7/2003 | Godik et al. |
| 6,647,092 | B2 | 11/2003 | Eberhard |
| 6,682,484 | B1 | 1/2004 | Entrekin et al. |
| 6,765,984 | B2 | 7/2004 | Higgins et al. |
| 6,850,590 | B2 | 2/2005 | Galkin |
| 6,968,033 | B2 | 11/2005 | Lebovic et al. |
| 6,974,255 | B1 | 12/2005 | Hixson, Sr. |
| 6,975,701 | B2 | 12/2005 | Galkin |
| 7,123,684 | B2 | 10/2006 | Jing et al. |
| 7,203,348 | B1 | 4/2007 | Karrsemeijer |
| 7,245,694 | B2 | 7/2007 | Jing et al. |
| 7,319,735 | B2 | 1/2008 | DeFreitas |
| 7,430,272 | B2 | 9/2008 | Jing et al. |
| 7,489,761 | B2 | 2/2009 | DeFreitas et al. |
| 7,505,555 | B2 | 3/2009 | Hermann et al. |
| 7,512,211 | B2 | 3/2009 | Galkin |
| 7,583,786 | B2 | 9/2009 | Jing et al. |
| 7,634,049 | B2 | 12/2009 | Galkin |
| 7,639,780 | B2 | 12/2009 | Minyard |
| 7,656,993 | B2 | 2/2010 | Hoernig |
| 7,702,142 | B2 | 4/2010 | Ren et al. |
| 7,742,558 | B2 | 6/2010 | Mertelmeier et al. |
| 7,760,853 | B2 | 7/2010 | Jing et al. |
| 7,792,244 | B2 | 9/2010 | DeFreitas et al. |
| 7,822,457 | B2 | 10/2010 | Lokhandwalla et al. |
| 7,831,296 | B2 | 11/2010 | Defreitas |
| 7,869,563 | B2 | 1/2011 | Defreitas et al. |
| 8,155,421 | B2 | 4/2012 | Ren et al. |
| 8,175,219 | B2 | 5/2012 | DeFreitas et al. |
| 8,787,522 | B2 | 7/2014 | Smith et al. |
| 9,050,009 | B2 | 6/2015 | Den Heeten |
| 9,226,718 | B1 | 1/2016 | Baxley |
| 9,332,947 | B2 | 5/2016 | DeFreitas et al. |
| 9,498,180 | B2 | 11/2016 | Ren et al. |
| 9,649,075 | B2 | 5/2017 | DeFreitas et al. |
| 9,743,997 | B2 | 8/2017 | Grimbergen |
| 9,782,135 | B2 | 10/2017 | Stango et al. |
| 9,826,950 | B2 | 11/2017 | Den Heeten |
| 10,603,002 | B2 | 3/2020 | Stango |
| 10,888,292 | B2 | 1/2021 | Stango |
| 11,259,759 | B2 | 3/2022 | Stango et al. |
| 11,633,164 | B2 | 4/2023 | Stango |
| 11,950,941 | B2 | 4/2024 | Stango |
| 2001/0038861 | A1 | 11/2001 | Hsu |
| 2002/0032373 | A1 | 3/2002 | Godik et al. |
| 2002/0061090 | A1 | 5/2002 | Lindstrom |
| 2003/0007597 | A1 | 1/2003 | Higgins et al. |
| 2003/0007598 | A1 | 1/2003 | Wang et al. |
| 2003/0099325 | A1 | 5/2003 | Galkin |
| 2003/0174807 | A1 | 9/2003 | Lebovic |
| 2004/0066882 | A1 | 4/2004 | Eberhard |
| 2004/0066884 | A1 | 4/2004 | Claus |
| 2004/0066904 | A1 | 4/2004 | Eberhard |
| 2004/0094167 | A1 | 5/2004 | Brady |
| 2004/0156472 | A1 | 8/2004 | Galkin |
| 2004/0218727 | A1 | 11/2004 | Shoenfeld |
| 2005/0008117 | A1 | 1/2005 | Livingston |
| 2005/0063509 | A1 | 3/2005 | DeFreitas et al. |
| 2005/0113681 | A1 | 5/2005 | DeFreitas et al. |
| 2005/0113683 | A1 | 5/2005 | Lokhandwalla et al. |
| 2005/0113863 | A1 | 5/2005 | Ramzipoor et al. |
| 2006/0050844 | A1 | 3/2006 | Galkin |
| 2006/0165215 | A1 | 7/2006 | Galkin |
| 2007/0081625 | A1 | 4/2007 | Sendai |
| 2007/0223652 | A1 | 9/2007 | Galkin |
| 2007/0242794 | A1 | 10/2007 | Stanton |
| 2007/0280412 | A1 | 12/2007 | Defreitas et al. |
| 2008/0043904 | A1 | 2/2008 | Hoernig |
| 2008/0080668 | A1 | 4/2008 | Kashiwagi |
| 2008/0087830 | A1 | 4/2008 | Kashiwagi |
| 2008/0181361 | A1 | 7/2008 | Eldered et al. |
| 2008/0240345 | A1 | 10/2008 | Galkin |
| 2008/0242979 | A1 | 10/2008 | Fischer et al. |
| 2008/0247508 | A1 | 10/2008 | Harrington |
| 2009/0003519 | A1 | 1/2009 | DeFreitas et al. |
| 2009/0135997 | A1 | 5/2009 | DeFreitas |
| 2009/0175408 | A1 | 7/2009 | Goodsitt et al. |
| 2009/0262887 | A1 | 10/2009 | Iordache et al. |
| 2009/0268865 | A1 | 10/2009 | Ren |
| 2009/0304146 | A1 | 12/2009 | Ramsauer |
| 2009/0324049 | A1 | 12/2009 | Kontos et al. |
| 2010/0046698 | A1 | 2/2010 | Lebovic et al. |
| 2010/0049093 | A1 | 2/2010 | Galkin |
| 2010/0111249 | A1 | 5/2010 | Mertelmeir et al. |
| 2010/0329418 | A1 | 12/2010 | Blevis |
| 2011/0058724 | A1 | 3/2011 | Claus |
| 2011/0064190 | A1 | 3/2011 | Ruimi |
| 2011/0087098 | A1 | 4/2011 | Fischer et al. |
| 2011/0257919 | A1 | 10/2011 | Reiner |
| 2012/0033868 | A1 | 2/2012 | Ren |
| 2012/0051522 | A1 | 3/2012 | Nishino |
| 2012/0114095 | A1 | 5/2012 | Smith et al. |
| 2012/0150034 | A1 | 6/2012 | DeFreitas |
| 2012/0277625 | A1 | 11/2012 | Nakayama |
| 2013/0012837 | A1 | 1/2013 | Krogure |
| 2013/0028499 | A1 | 1/2013 | Tsujii |
| 2013/0051520 | A1 | 2/2013 | Ramsauer |
| 2013/0129039 | A1 | 5/2013 | DeFreitas et al. |
| 2013/0272493 | A1 | 10/2013 | Otokuni |
| 2014/0107493 | A1 | 4/2014 | Yuer |
| 2014/0296701 | A1 | 10/2014 | Hancu et al. |
| 2014/0328458 | A1 | 11/2014 | Erhard et al. |
| 2014/0378816 | A1 | 12/2014 | Oh |
| 2015/0272682 | A1 | 10/2015 | Sheng |
| 2015/0282770 | A1 | 10/2015 | Klanian et al. |
| 2015/0297163 | A1* | 10/2015 | Kim ............ H04N 23/30 378/37 |
| 2016/0066875 | A1 | 3/2016 | Jacob et al. |
| 2016/0081633 | A1 | 3/2016 | Stango et al. |
| 2016/0166234 | A1 | 6/2016 | Zhang |
| 2016/0183889 | A1 | 6/2016 | Matsuura |
| 2016/0242707 | A1 | 8/2016 | Defreitas et al. |
| 2017/0055930 | A1 | 3/2017 | Hagiwara |
| 2017/0251991 | A1 | 9/2017 | Wang |
| 2017/0340303 | A1 | 11/2017 | Stango |
| 2017/0347976 | A1 | 12/2017 | DeFreitas et al. |
| 2018/0125437 | A1 | 5/2018 | Stango et al. |
| 2018/0165840 | A1 | 6/2018 | Bernard |
| 2018/0184999 | A1 | 7/2018 | Davis |
| 2020/0069274 | A1 | 3/2020 | Stango |
| 2020/0178926 | A1 | 6/2020 | Kshirsagar |
| 2020/0196971 | A1 | 6/2020 | Laviola |
| 2020/0359974 | A1 | 11/2020 | DeFreitas |
| 2020/0359975 | A1 | 11/2020 | Banks |
| 2020/0390405 | A1 | 12/2020 | DeFreitas |
| 2021/0015435 | A1 | 1/2021 | DeFreitas |

(56) References Cited

U.S. PATENT DOCUMENTS

| | | |
|---|---|---|
| 2021/0113169 A1 | 4/2021 | Stango |
| 2021/0228165 A1 | 7/2021 | Defreitas |
| 2022/0087627 A1 | 3/2022 | Stango |
| 2023/0233161 A1 | 7/2023 | DeFreitas |
| 2023/0346329 A1 | 11/2023 | Stango |
| 2023/0355190 A1 | 11/2023 | DeFreitas |
| 2023/0363726 A1 | 11/2023 | Banks |
| 2024/0245364 A1 | 7/2024 | Stango |
| 2024/0341710 A1 | 10/2024 | Stango |

FOREIGN PATENT DOCUMENTS

| | | |
|---|---|---|
| CN | 1738573 | 2/2006 |
| CN | 1810209 | 8/2006 |
| CN | 101766490 A | 7/2010 |
| CN | 102196772 | 9/2011 |
| CN | 102448375 | 5/2012 |
| CN | 102781328 | 11/2012 |
| CN | 103281961 | 9/2013 |
| CN | 104066374 | 9/2014 |
| CN | 105286904 | 2/2016 |
| CN | 105637562 | 6/2016 |
| CN | 105769236 | 7/2016 |
| CN | 107170031 | 9/2017 |
| CN | 107518908 | 12/2017 |
| CN | 109893158 | 6/2019 |
| CN | 211432963 | 9/2020 |
| CN | 112004473 | 11/2020 |
| CN | 115348838 | 11/2022 |
| DE | 10 2017 207147 | 10/2018 |
| EP | 955886 | 11/1999 |
| EP | 1004274 A1 | 5/2000 |
| EP | 2716228 | 4/2014 |
| EP | 2341832 B1 | 7/2014 |
| EP | 2943125 B1 | 9/2018 |
| GB | 2545641 | 6/2017 |
| JP | S53-103672 | 8/1978 |
| JP | H03-86154 | 4/1991 |
| JP | H05-076409 U | 3/1992 |
| JP | 2003-525681 | 9/2003 |
| JP | 2004-261306 | 9/2004 |
| JP | 2005-523043 | 8/2005 |
| JP | 2006-212427 | 8/2006 |
| JP | 2007-135704 | 6/2007 |
| JP | 2008-518722 A | 6/2008 |
| JP | 2009-526618 A | 7/2009 |
| JP | 2009-219656 | 10/2009 |
| JP | 8-215172 | 3/2010 |
| JP | 2011-072667 | 4/2011 |
| JP | 2011-206436 | 10/2011 |
| JP | 2011-206438 | 10/2011 |
| JP | 2011-206439 | 10/2011 |
| JP | 2011-212111 | 10/2011 |
| JP | 2011-224351 | 11/2011 |
| JP | 2011-250842 | 12/2011 |
| JP | 2012-125536 | 7/2012 |
| JP | 2012-170718 | 9/2012 |
| JP | 2012-228404 | 11/2012 |
| JP | 2013017491 | 1/2013 |
| JP | 2014-068884 | 4/2014 |
| JP | 2014-068885 | 4/2014 |
| JP | 2015-027382 | 2/2015 |
| JP | 2016-022061 | 2/2016 |
| JP | 2016-517740 | 6/2016 |
| KR | 10-2011-0089446 | 8/2011 |
| KR | 10-2014-0058066 | 5/2014 |
| NL | 2020910 B1 | 11/2019 |
| WO | 2004/030523 | 4/2004 |
| WO | 2006/050466 | 5/2006 |
| WO | 2010/028208 | 3/2010 |
| WO | 2010/102087 | 9/2010 |
| WO | 2011/058730 | 5/2011 |
| WO | 2014059366 | 4/2014 |
| WO | 2014/074602 | 5/2014 |
| WO | 2014/176445 | 10/2014 |
| WO | 2015/054518 | 4/2015 |
| WO | 2016/073445 | 5/2016 |
| WO | 2018/067005 | 4/2018 |
| WO | 2018/089118 | 5/2018 |
| WO | 2018/170265 | 9/2018 |
| WO | 2019/004821 | 1/2019 |
| WO | 2019/088826 | 5/2019 |
| WO | 2019/227051 | 11/2019 |
| WO | 20190227042 | 11/2019 |
| WO | 20190227044 | 11/2019 |

OTHER PUBLICATIONS

Grant, D.G., "Tomosynthesis: a three-dimensional imaging technique", IEEE Trans. Biomed. Engineering, vol. BME-19, #1, (Jan. 1972), pp. 20-28.

PCT International Search Report and Written Opinion in International Application PCT/US2022/026336, mailed Jul. 11, 2022, 14 pages.

PCT International Preliminary Report on Patentability in International Application PCT/US2022/026336, mailed Nov. 9, 2023, 8 pages.

U.S. Appl. No. 60/628,516 entitled "Matching geometry generation and display of mammograms and tomosynthesis images", filed Nov. 15, 2004, 20 pgs.

* cited by examiner

SYSTEMS AND METHODS FOR MEASURING THICKNESS OF FOAM COMPRESSIVE ELEMENTS

CROSS-REFERENCE TO RELATED APPLICATION

This application is a National Stage Application of PCT/US2022/026336, filed on Apr. 26, 2022, which claims the benefit of U.S. Provisional Application No. 63/179,816, filed Apr. 26, 2021, the entire disclosures of which are incorporated herein by reference in their entireties. To the extent appropriate, a claim of priority is made to each of the above disclosed applications.

BACKGROUND

Compression during mammography and tomosynthesis imaging serves a number of purposes. For example, it: (1) makes the breast thinner in the direction of x-ray flux and thereby reduces patient radiation exposure from the level required to image the thicker parts of a breast that are not compressed; (2) makes the breast more uniform in thickness in the direction of x-ray flux and thereby facilitates more uniform exposure at the image plane over the entire breast image; (3) immobilizes the breast during the x-ray exposure and thereby reduces image blurring; and (4) brings breast tissues out from the chest wall into the imaging exposure field and thus allows for more tissue imaging. As the breast is being compressed, typically a technologist manipulates the breast to position it appropriately and counter the tendency that compression has of pushing breast tissue toward the chest wall and out of the image field.

Standard compression methods for mammography and tomosynthesis use a movable, rigid, radiolucent compression paddle. The breast is placed on a breast support platform that typically is flat, and the paddle then compresses the breast, usually while a technologist or other health professional is holding the breast in place. The technologist may also manipulate the breast to ensure proper tissue coverage in the image receptor's field of view.

One known challenge in mammography and breast tomosynthesis is the discomfort the patient may feel when the breast is compressed, which must be done with sufficient force to immobilize the breast and spread out the breast tissues for x-ray imaging. Discomfort may potentially cause the patient to move, which negatively impacts image quality. Discomfort may also potentially dissuade patients from getting screened for breast cancer. Another known challenge is to ensure that the imaged field includes the desired amount of breast tissue.

SUMMARY

In one aspect, the technology relates to a method of imaging a breast of a patient with a breast imaging system, the method including: supporting the breast on a breast support platform; applying a compressive force to the breast with a breast immobilization element including a rigid substrate, a foam compressive element secured below the rigid substrate, and a force sensor, and wherein the foam compressive element is in contact with the breast during application of the compressive force; detecting a force signal at the force sensor based on the applied compressive force; determining a compressed thickness of the breast proximate the force sensor based at least in part on the detected force signal at the force sensor; and setting an automatic exposure control based at least in part on the determined thickness of the breast proximate the force sensor. In an example, determining the compressed thickness of the breast proximate the force sensor includes: determining a separation distance between the breast support platform and the rigid substrate; obtaining a compressed foam thickness proximate the force sensor based at least in part on the detected force signal at the force sensor; and subtracting the compressed foam thickness proximate the force sensor from the separation distance to determine the compressed thickness of the breast proximate the force sensor. In another example, the force sensor is disposed proximate a front wall of the rigid substrate and proximate a centerline extending from the front wall. In yet another example, setting the automatic exposure control is further based at least in part on at least one of the compressed foam thickness and a foam density. In still another example, the force sensor includes a plurality of force sensors.

In another example of the above aspect, the plurality of force sensors are arranged in a grid pattern on the rigid substrate. In an example, the plurality of force sensors are arranged disposed along a centerline extending from a front wall of the rigid substrate. In another example, the compressed foam thickness proximate the force sensor, and the compressed thickness of the breast proximate the force sensor are substantially vertically aligned. In yet another example, the compressed foam thickness proximate the force sensor, the compressed thickness of the breast proximate the force sensor, and the force sensor are substantially vertically aligned. In still another example, the at least one force sensor includes a plurality of force sensors disposed along a line extending from a front edge of the breast immobilization element.

In another example of the above aspect, the line is disposed along a central region of the rigid substrate. In an example, the method further includes determining the compressed thickness of the foam compressive element. In another example, determining the compressed thickness of the foam compressive element at the at least one force sensor includes obtaining a foam thickness measurement from a look-up table including a plurality of force signals and a plurality of corresponding foam thickness measurements. In yet another example, the method further includes identifying a foam compressive element type, and wherein the look-up table is associated with the foam compressive element type. In still another example, identifying the foam compressive element type includes receiving an identification signal.

In another example of the above aspect, determining the compressed thickness of the breast is based at least in part on the determined thickness of the foam compressive element at the foam sensor and a separation distance between the breast support platform and the rigid substrate. In an example, the compressed thickness of the foam compressive element is at a location of the foam compressive element substantially vertically aligned with the at least one force sensor. In another example, the at least one force sensor is disposed between the rigid substrate and the foam compressive element. In yet another example, the at least one force sensor is disposed within the foam compressive element.

DETAILED DESCRIPTION

In examples described below, systems and methods of imaging a breast and measuring breast thickness are described. With the introduction of paddles having foam compressive elements to imaging systems, new methods of determining breast thickness are needed. This is because with a paddle having a foam compressive element, breast thickness becomes unknown due to the presence of compressed foam in between the breast and the rigid portion of the paddle. Further, the compressive foam tends to deflect unevenly, along both a length and width of the breast. Accurate breast thickness (e.g., at the thickest location thereof) is important for determination of automatic exposure control (AEC) and dose to the breast. The systems and methods described herein utilize one or more sensors to detect a force transmitted through the foam (due to deflection from contact with the breast). The detected force at a particular force sensor enables measurement of the deflection of the foam at that location, which may ultimately be used to measure the thickness of the breast at that location. Thus, the technologies described herein can also be used to determine not just the thickness of the thickest portion of the breast, but can also be used to determine compressed breast area size, compressed breast shape, etc.

In breast imaging, adequate x-ray dose must be delivered to the densest portion of breast to achieve acceptable image quality for the entire breast. To image a breast, prior to x-ray exposure, it is desirable to know the breast thickness. Each particular breast thickness (e.g., at the thickest location of the breast), is associated with a predetermined kilovoltage peak (kVp) and an appropriate filter. With conventional rigid type paddles, breast thickness can be measured by the separation distance S directly. With paddles having foam compressive elements, however, determining breast thickness is complicated due to the presence of the compressed foam, as well as the non-uniformity of the compressed breast tissue. Once the thickness is determined (consistent with the disclosures herein) and kVp and filter selected, a low pre-exposure (e.g., an AEC scout exposure) x-ray emission is emitted first to the breast, to locate the densest point in a breast. This ensures that an adequate dose to achieve optimal image quality at the densest point in the main exposure is subsequently delivered. Thus, the technologies described herein provide a method to measure breast thickness before imaging x-ray exposure is taken. Algorithms used in AEC calculations search for the densest point in a breast, which corresponds to the location with maximum x-ray attenuation. Attenuation is due to contributions from both local breast thickness and dense fiber-glandular tissue at that location. Thus, knowing the thickest point of the breast is required to properly calculate AEC.

Figure 1A:
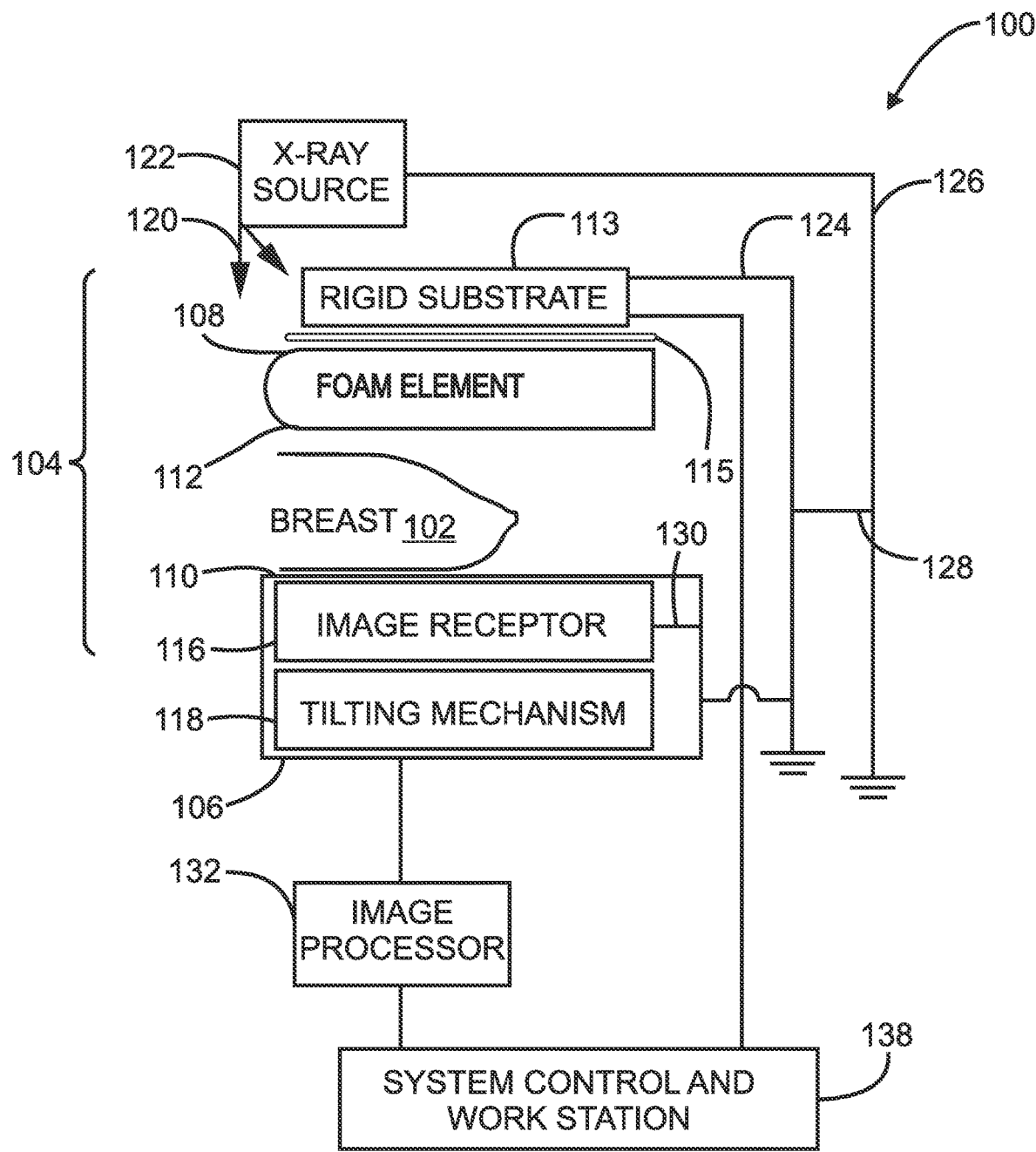
FIG. 1A is a schematic view of an exemplary imaging system.
Figure 1B:
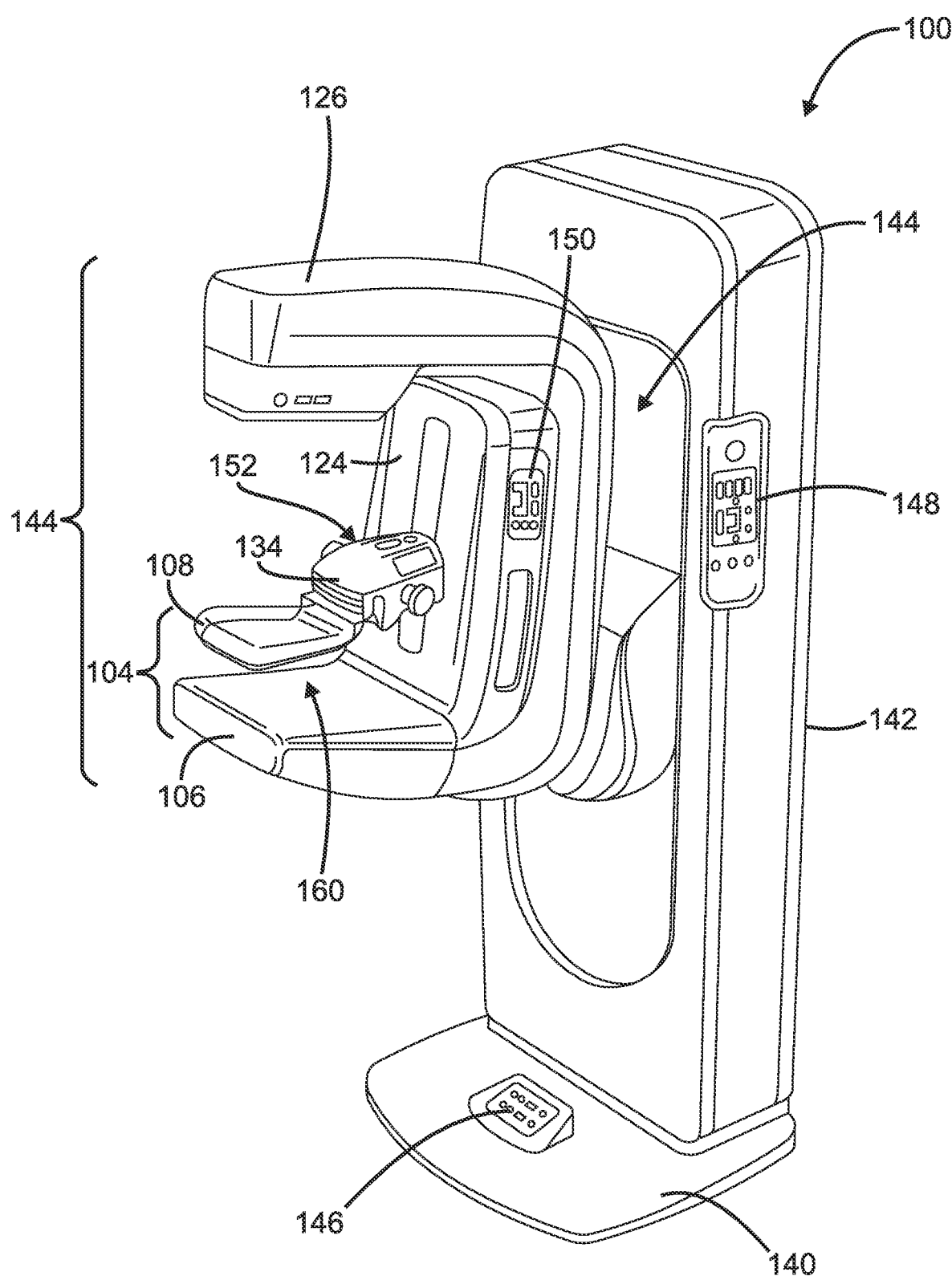
FIG. 1B is a perspective view of the imaging system of FIG. 1A.

FIG. 1A is a schematic view of an exemplary imaging system 100. FIG. 1B is a perspective view of the imaging system 100. Referring concurrently to FIGS. 1A and 1, not every element described below is depicted in both figures. The imaging system 100 immobilizes a patient's breast 102 for x-ray imaging (either or both of mammography and tomosynthesis) via a breast compression immobilizer unit 104 that includes a static breast support platform 106 and a foam compressive element 108. Different paddles, each having different purposes, are known in the art. Certain examples paddles are also described herein for context. The breast support platform 106 and the foam compressive element 108 each have a compression surface 110 and 112, respectively, that move towards each other to compress, immobilize, stabilize, or otherwise hold and secure the breast 102 during imaging procedures. In known systems, the compression surface 110, 112 is exposed so as to directly contact the breast 102. Compression surface 110 may be a rigid plastic, a flexible plastic, a resilient foam, a mesh or screen, and so on. Compression surface 112 is a lower surface of the foam compressive element 108, which is secured to a rigid substrate 113. The platform 106 also houses an image receptor 116 and, optionally, a tilting mechanism 118, and optionally an anti-scatter grid (not depicted, but disposed above the image receptor 116). The immobilizer unit 104 is in a path of an imaging beam 120 emanating from x-ray source 122, such that the beam 120 impinges on the image receptor 116. One or more sensor elements 115, described in further detail herein, are disposed between the foam compressive element 108 and the rigid substrate 113. In an alternative example, one or more sensor elements 115 may be disposed within the foam compressive element 108.

The immobilizer unit 104 is supported on a first support arm 124 via a compression arm 134, which is configured to be raised and lowered along the support arm 124. The x-ray source 122 is supported on a second support arm, also referred to as a tube head 126.

For mammography, support arms 124 and 126 can rotate as a unit about an axis 128 between different imaging orientations such as CC and MLO, so that the system 100 can take a mammogram projection image at each orientation. In operation, the image receptor 116 remains in place relative to the platform 106 while an image is taken. The immobilizer unit 104 releases the breast 102 for movement of arms 124, 126 to a different imaging orientation. For tomosynthesis, the support arm 124 stays in place, with the breast 102 immobilized and remaining in place, while at least the second support arm 126 rotates the x-ray source 122 relative to the immobilizer unit 104 and the compressed breast 102 about the axis 128. The system 100 takes plural tomosynthesis projection images of the breast 102 at respective angles of the beam 120 relative to the breast 102.

Concurrently and optionally, the image receptor 116 may be tilted relative to the breast support platform 106 and in sync with the rotation of the second support arm 126. The tilting can be through the same angle as the rotation of the x-ray source 122, but may also be through a different angle selected such that the beam 120 remains substantially in the same position on the image receptor 116 for each of the plural images. The tilting can be about an axis 130, which can but need not be in the image plane of the image receptor 116. The tilting mechanism 118 that is coupled to the image receptor 116 can drive the image receptor 116 in a tilting motion. For tomosynthesis imaging and/or CT imaging, the breast support platform 106 can be horizontal or can be at an angle to the horizontal, e.g., at an orientation similar to that for conventional MLO imaging in mammography. The system 100 can be solely a mammography system, a CT system, or solely a tomosynthesis system, or a "combo" system that can perform multiple forms of imaging. An example of such a combo system has been offered by the assignee hereof under the trade name Selenia Dimensions.

When the system is operated, the image receptor 116 produces imaging information in response to illumination by the imaging beam 120, and supplies it to an image processor 132 for processing and generating breast x-ray images. A system control and work station unit 138 including software controls the operation of the system and interacts with the operator to receive commands and deliver information including processed-ray images.

The imaging system 100 includes a floor mount or base 140 for supporting the imaging system 100 on a floor. A gantry 142 extends upwards from the floor mount 140 and rotatably supports both the tube head 208 and a support arm 210. The tube head 126 and support arm 124 are configured to rotate discretely from each other and may also be raised and lowered along a face 144 of the gantry 142 so as to accommodate patients of different heights. The x-ray source 122 is disposed within the tube head 208. Together, the tube head 126 and support arm 124 may be referred to as a C-arm 144.

A number of interfaces and display screens are disposed on the imaging system 100. These include a foot display screen 146, a gantry interface 148, a support arm interface 150, and a compression arm interface 152. In general the various interfaces 148, 150, and 152 may include one or more tactile buttons, knobs, switches, as well as one or more display screens, including capacitive touch screens with graphic user interfaces (GUIs) so as to enable user interaction with and control of the imaging system 100. In general, the foot display screen 146 is primarily a display screen, though a capacitive touch screen might be utilized if required or desired.

One challenge with the imaging system 100 is how to immobilize and compress the breast 102 for the desired or required imaging. A health professional, typically an x-ray technologist, generally adjusts the breast 102 within the immobilizer unit 104 while pulling tissue towards imaging area and moving the foam compressive element 108 toward the breast support platform 106 to immobilize the breast 102 and keep it in place, with as much of the breast tissue as practicable being between the compression surfaces 110, 112.

During imaging of a breast, it is often desirable to immobilize the breast through compression. For instance, by compressing the breast, the breast can be made thinner, thus requiring a lower dose of radiation. Further, by immobilizing the breast, image blurring from movement of the breast during imaging is reduced. Other benefits may also be realized by compressing the breast. However, rigid breast compression paddles may cause discomfort to the patient whose breast is being compressed. One reason for discomfort that the patient may feel is that the compression force is non-uniformly distributed throughout the breast. It is often concentrated at the thickest portion of the breast, usually near the chest wall, at or near the lower front edge of the compression paddle and the upper front corner of the breast platform. The anterior portion of the breast, such as near the nipple, may receive less compressive force, or no compressive force. The paddle may not even contact this portion of the breast. (The terms front, lower, and upper pertain to using a craniocaudal (CC) imaging orientation, with the patient facing the front of the imaging system, although it should be understood that other imaging orientations, including mediolateral oblique (MLO), are used with the same equipment.)

To improve these issues, the compression systems described herein include a foam compressive element that is positioned below a lower surface of the rigid compressive paddle and contacts the breast during compression. Compression paddles utilizing foam compressive elements are described generally in PCT International Patent Application Nos. PCT/US2019/033998, PCT/US2019/034001, and PCT/US2019/034010, all filed May 24, 2019, the disclosures of which are hereby incorporated by reference herein in their entireties. Such paddles stabilize and compress the breast, while reducing discomfort associated with compression paddles having only rigid compressive surfaces.

The foam at least partially conforms in shape to the breast as the paddle is lowered and the foam compresses, thus stabilizing the breast for imaging, without requiring the compression pressure typical in breast imaging systems with rigid paddles. The foam can also be placed underneath the breast (e.g., secured to the breast support platform). Additionally, the foam may be placed on the portions of the compression paddle and breast platform that face the chest wall. As the compression paddle is lowered, the foam compresses and takes on a curved shaped that approximates the shape of the breast. However, unlike hard plastic compression paddles, compression forces need not be so high as to completely flatten the breast. Rather, the foams described herein are utilized to stabilize the breast, not necessarily to effectuate full compression, which is usually performed by flat rigid compression paddles (or by breast compression elements that have a very thin layer of foam disposed thereon. In a traditional mammogram system, since the breast is not flat, the appearance of the breast would differ (depending on the level of compression of the particular volume of interest), although this appearance may be corrected by image processing algorithms. For imaging systems such as tomosynthesis, however, the foam only appears in slices outside of the boundaries of the breast. For slices inside the breast, the structures blur out and are not visible. As such, the paddles utilizing foams described herein may be used for both mammography and tomosynthesis imaging, although some post-imaging processing may be required to realize all advantages thereof.

Figure 2A:
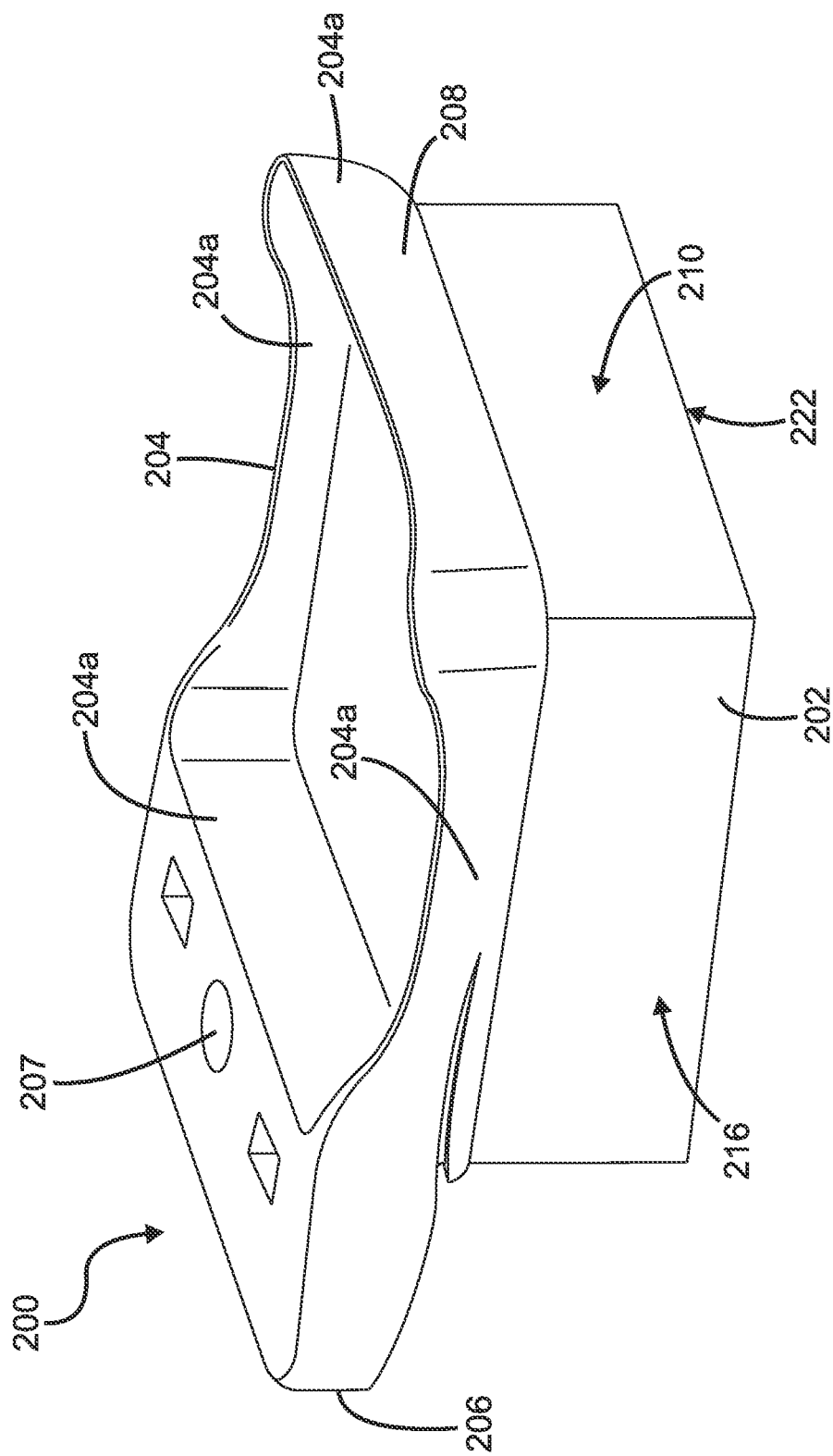
FIGS. 2A-2C are various views of a breast compression paddle having a foam compressive element.
Figure 2B:
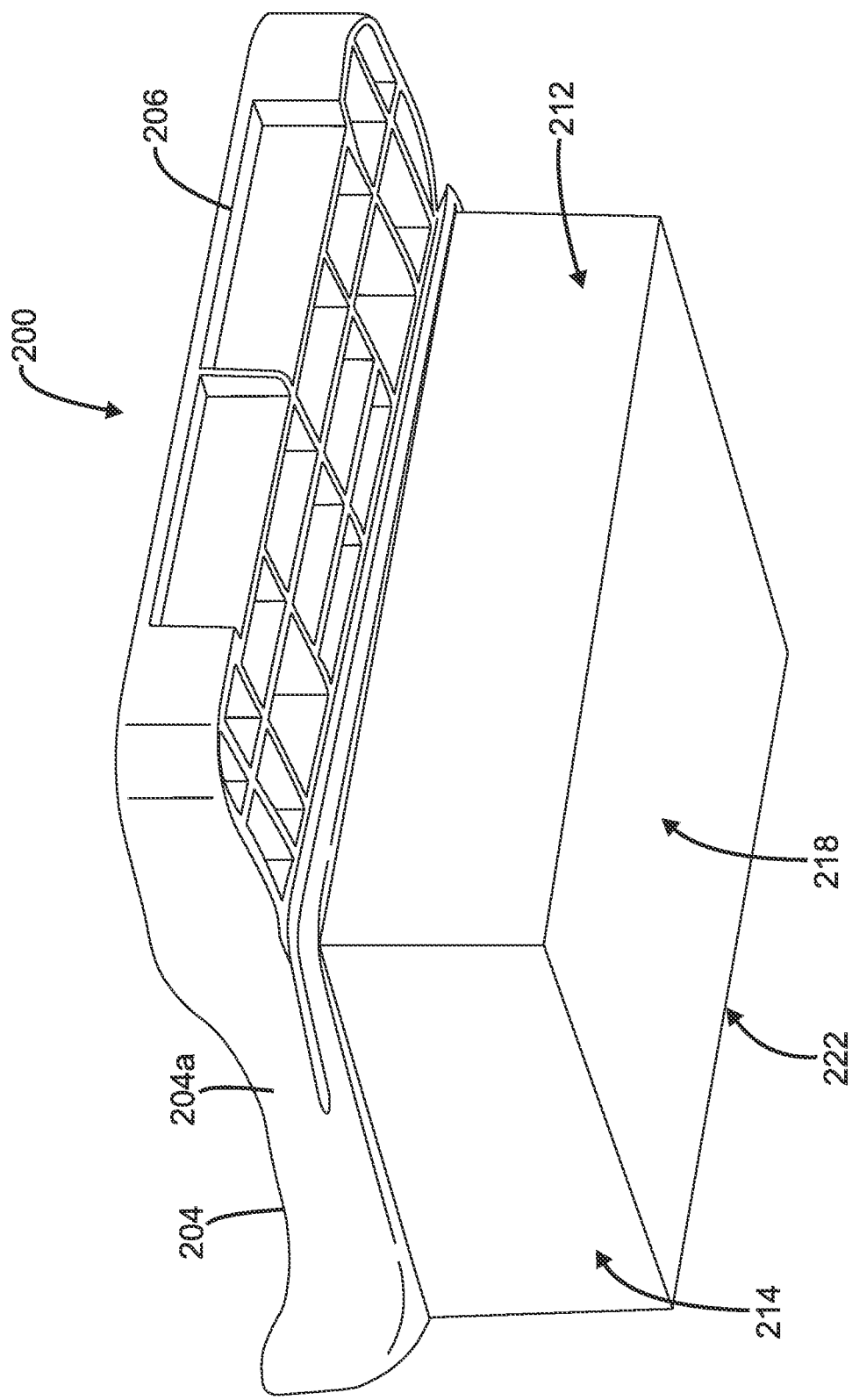
Figure 2C:
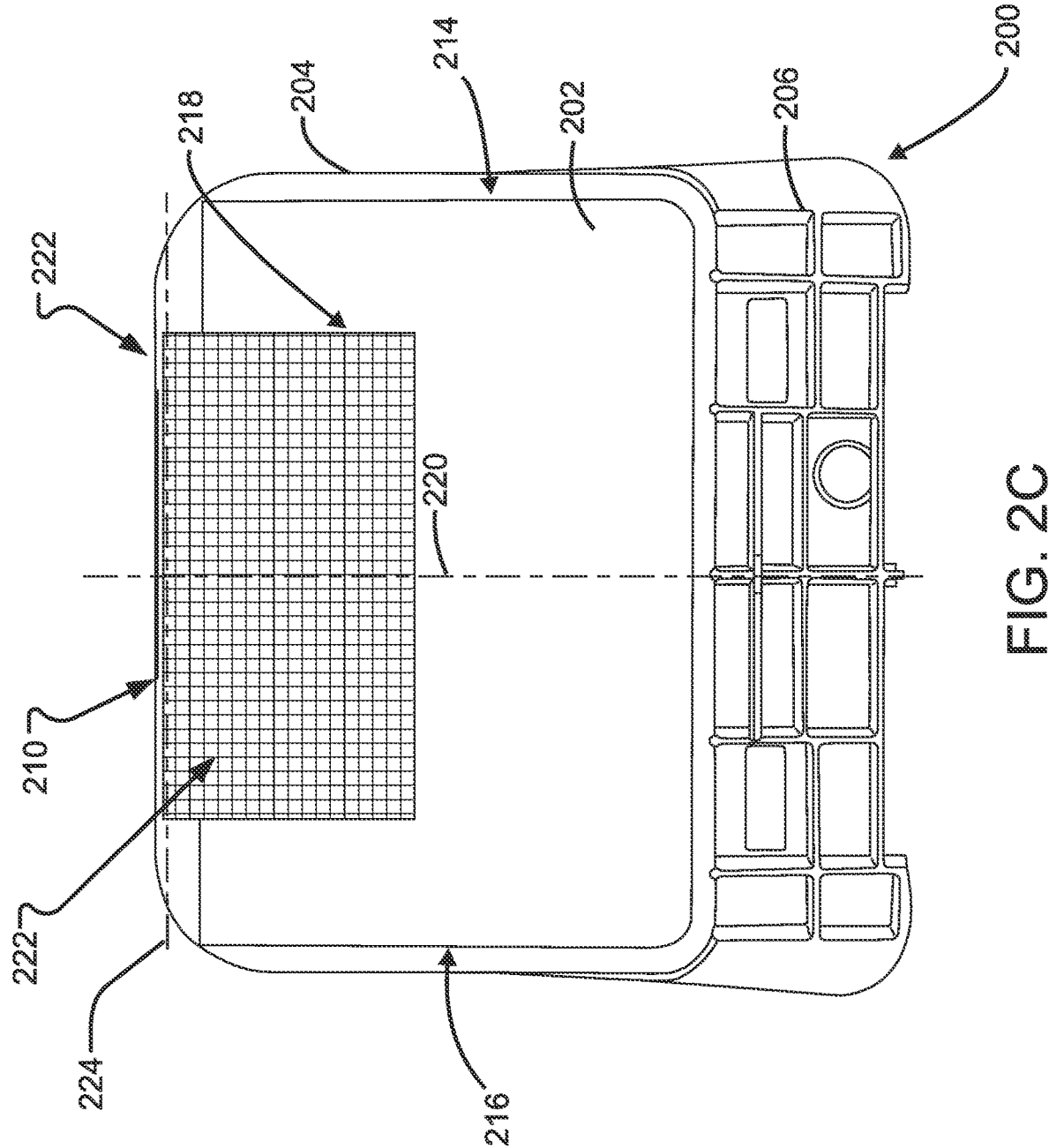

FIGS. 2A-2C are various views of a breast compression paddle 200 having a foam compressive element 202 secured to a rigid substrate 204. FIGS. 2A-2C are described concurrently. The paddle 200 includes a bracket portion 206, generally integral with the substrate 204 for connecting the paddle to compression arm of an imaging system. The bracket portion 206 is generally a reinforced portion of the paddle 200 and may be made of the same material as the rigid substrate 204. In examples, the bracket portion is formed integral with the rigid substrate 204. The paddle 200 also includes a leading face 208, opposite the bracket portion 206, which is disposed proximate a chest wall of a patient during compression and imaging procedures. In examples, the substrate may be rigid. As used herein, the term "rigid" does not imply that the substrate 204 is free from bending during compression of a breast, rather that the substrate 204 displays greater resistance to bending or deformation than the foam compressive element 202 secured to a bottom of the substrate 204. Raised walls 204a provide additional rigidity.

The foam compressive element 202 may be secured to a bottom surface of the substrate 204 with a chemical adhesive. In other example, an upper surface of the compressive element may be a rigid plastic or other material to which the foam compressive element 202 is secured. A plurality of bolts, hooks, or other mechanical fasteners (not shown) may be used to connect this rigid plastic to the rigid substrate 204 of the paddle 200. If such mechanical fasteners are used, it may be desirable to dispose said fasteners away from areas of the foam compressive material 202 that are expected to compress against a breast, so as to avoid pressure points and resulting discomfort associated therewith, as well as to prevent artifacts from appearing in any resulting x-ray images. An RFID chip, bar code, or other readable feature 207 may be disposed on or in the bracket portion 206, to be read by a corresponding reader on the compression arm.

The foam compressive element 202 includes a number of edge surfaces. A leading edge surface 210 is disposed proximate the leading face 208 of the substrate 204 so as to be disposed proximate the chest wall of a patient during compression and imaging procedures. A trailing edge surface 212 is disposed opposite the leading edge surface 210, proximate the bracket portion 206. Lateral edge surfaces 214, 216 are also depicted. In general, these lateral edge surfaces 214, 216 may be depicted as inner or outer lateral edge surfaces, consistent with terminology typically used to describe inner and outer sides of the breast. Of course, a person of skill in the art will recognize that the same compression paddle 200 may be used to compress either breast, one at a time, which would effectively change the application of the terms "inner" and "outer" to the lateral edge surfaces of the foam compressive material 202. Further, a mid-plane 220 is disposed between the lateral edge surfaces 214, 216, at an approximate midpoint thereof. The mid-plane 220 is disposed substantially orthogonal to a compressive surface 218 that is disposed on an underside of the foam compressive material 202.

Portions of the compressive surface 218 will contact the breast during compression. In another example, the foam compressive material 202 may be covered with a biocompatible cover, which may protect the foam compressive material 202 from absorbing bodily fluids. In examples, the cover may be disposable or cleanable. To improve the patient experience, the cover may be manufactured of a soft material where it contacts the patient. To prevent fluid transfer into the foam compressive material 202, an opposite plastic side may contact the foam compressive material 202. An interface 222 is located where the compressive surface 218 meets the leading edge surface 210. The shape of the interface 222 aids during compression in defining the foam compressive material 202 and the function thereof.

FIG. 2C depicts schematically a grid of sensors 224 that may be disposed between the rigid substrate 204 and the foam compressive material 202. The sensors may be disposed in any area of the paddle 200, but may be particularly advantageously arranged proximate the leading edge surface 210 of the foam compressive element 202. The density of the grid of sensors 222 may be as required or desired for a particular application, although greater number of sensors 222 may provide more accurate results. The sensors 222 detect force applied to the foam compressive element 202 during immobilization and compression procedures, which will enable further functionality as described elsewhere herein. In another example, one or more sensors may be arranged along a line positioned on the mid-plane 220 of the rigid substrate 204. This location corresponds to locations on the detector (below the breast support platform) that are utilized to calculate the automatic exposure control (AEC) prior to imaging procedures. In other examples, the sensors may be disposed along or parallel to line 224, which is parallel to the leading edge surface 210. Other sensor locations and configurations are contemplated; regardless, the locations of the sensors may be used to detect a compressed thickness of the foam compressive element 202 disposed proximate thereto and enables the further functionalities described below, such as determining breast thickness.

Figure 2D:
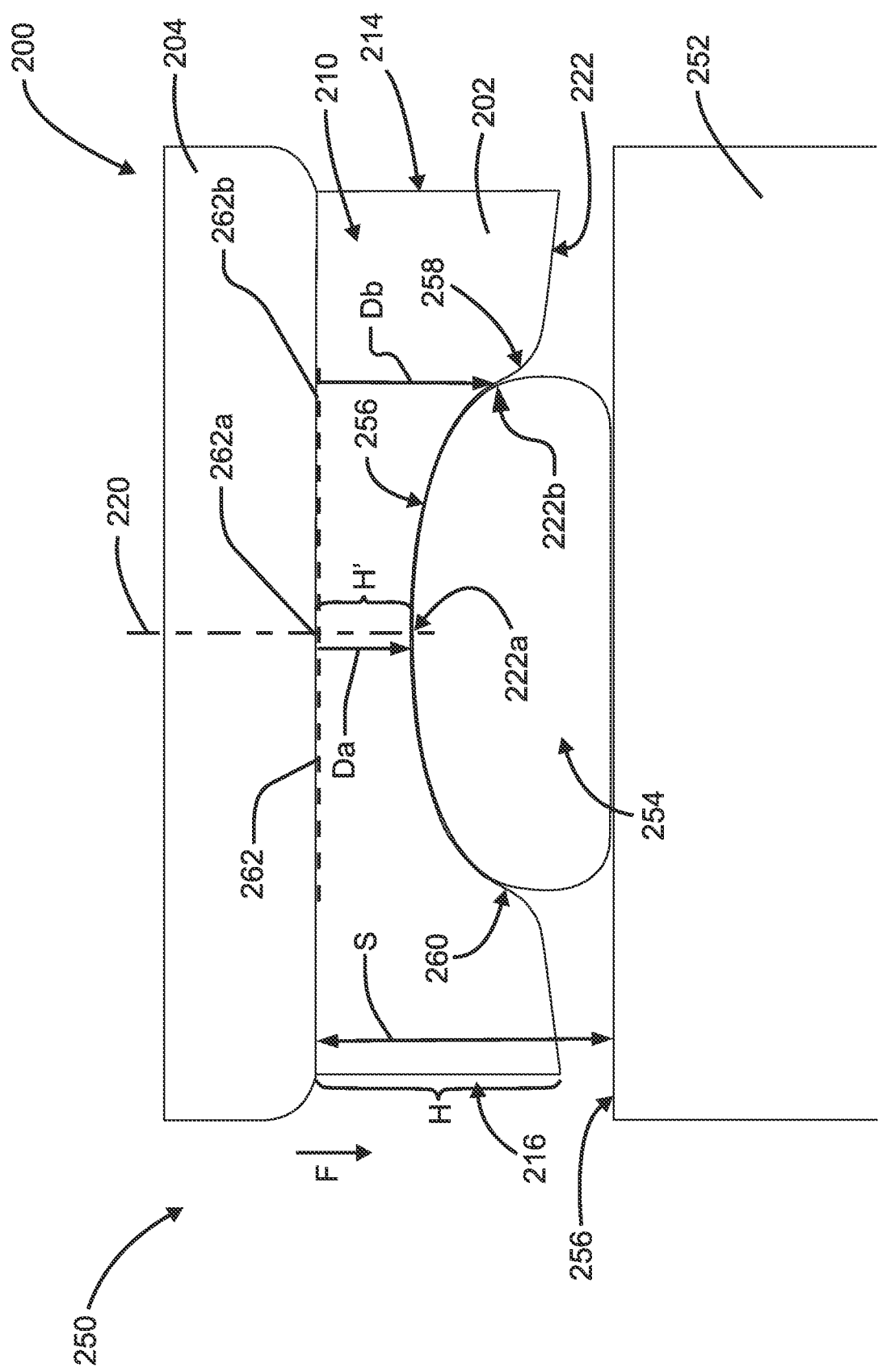
FIG. 2D is a front view of the breast compression paddle of FIGS. 2A-2C compressing a breast.

FIG. 2D is a front view of a compression system 250 for an imaging system. The compression system 250 includes a first compression element in the form of a compression paddle 200 having a rigid substrate 204 and a foam compressive element 202 secured thereto. A second compression element, in this case a breast support platform 252 is also depicted. A breast 254 resting on an upper surface 256 of the breast support platform 252 is also depicted. During use, the breast 254 is compressed by application of a force F by the compression paddle 200. The foam compressive material 202 deforms and conforms to the contours of the breast 254 as compression increases. As such, as the force F is increased, compression of both the breast 254 and foam compressive material 202 occurs. This compression may be defined by the percentage of compression of the foam compressive material 202 proximate the mid-plane 220 at the leading edge surface 210, when the breast 254 is substantially centered along the mid-plane 220. In other examples, the contours of the interface 222 may define the compression of the foam compressive material 202. A plurality of force sensors 260 are depicted at the interface between the rigid substrate 204 and the foam compressive element 202. The force sensors 262 may be those known in the art for small-scale application. For example, MEMS sensors may be utilized. Alternatively, a grid or other pattern of nanofibers (e.g., arranged in an x-y coordinate system) may also be utilized.

As described above, the foam compressive material 202 has an uncompressed height H of the front edge surface 210. In examples, the uncompressed height H may be about one inch to about two inches, about two inches to about three inches, or in excess of about three inches. It has been determined through testing that an uncompressed height H of about three inches is sufficient for compression of a significant number of breast sizes, from small to large. Prior to a tomosynthesis imaging procedure, the breast 254 may be compressed to an imaging condition, which in one example, is a condition to sufficiently stabilize the breast and compress the breast somewhat. Unlike in prior systems where compression with a hard compression paddle results in significant flattening of the breast, the imaging condition to which the breast is compressed need only be to a thickness where the resultant tomosynthesis images are a manageable number. Such a manageable number may be a diagnostically significant number, such that the resulting breast image slices may provide sufficient distinction between slices, but without having such a large number of images, which would necessitate significantly more review time by a clinician.

In examples, this imaging condition of the breast 254 is reached prior to complete compression of the foam compressive material 202 at the front edge surface 210. FIG. 2D depicts compression of the foam compressive material to a maximum amount required for the breast 254 to be in the imaging condition. For illustrative purposes, FIG. 2D depicts the breast 254 centered on the mid-plane or center-line 220 of the foam compressive material 202. The foam compressive element 202 also includes a compressed height H', which may vary across an upper surface of the breast 254. Even at this compressed state, the foam compressive material 202 may still be compressed further if further force F is applied to the breast 254. In examples, the imaging condition of the breast may be reached when only a portion of the foam compressive material 202 reaches the compressed height H'. A separation distance S between a bottom surface of the rigid substrate 204 and the support platform 252 is known via existing technologies.

The shape of the interface 222 may define the compression of the foam compressive material 202. The interface 222, for example, defines a generally smooth curvature 256 from a first contact point 258 proximate an inner side of the breast 254 to a second contact point 260 proximate an outer side of the breast 254. Depending on the number, location, and distribution of the force sensors 262, nine of which are depicted aligned along the front edge surface 210 in FIG. 2D for illustrative purposes, the compressed thickness H' of the foam compressive element 202 at various locations may be determined.

As the foam compressive element 202 is compressed due to the application of the force F, each force sensor 262 detects a force associated with vertical deflection of the foam compressive element 202 proximate thereto, or more specifically substantially vertically aligned therewith. Two illustrative force sensors 262a and 262b are depicted to illustrate the below explanation of positioning of the breast 254 relative to the force sensor 262. Force sensor 262a is disposed on the midplane or centerline 220 of the foam compressive element 202 and, for the purposes of this explanation, it is assumed that the breast 254 is also centered on this centerline 220. As such, once the force F is applied, the force sensor 262a will detect a signal associated with the compression of the foam compressive element 202 in a location generally vertically aligned with the force sensor 262a. This signal received corresponds to a distance Da, as described in more detail below. The signal received by the force sensor 262a accurately reflects the distance Da between the force sensor 262a and the location 222a on the surface of the breast 254 directly below the breast 254. Similarly, the force sensor 262b will detect a signal associated with the compression of the foam compressive element 202 in a location generally vertically aligned with the force sensor 262b. This signal received corresponds to a distance Db, as described in more detail below. The signal received by the force sensor 262a accurately reflects the distance Da between the force sensor 262a and the location 222a on the surface of the breast 254 directly below the breast 254.

The vertical thickness of the breast 254 at location 222a may be determined by subtracting from the distance Da from the distance S. As both the breast 254 and force sensor 262a are centered on each other, the vertical thickness of the breast at location 222a corresponds generally to the thickest compressed condition of the breast 254. Similarly, the signal received by the force sensor 262b accurately reflects the distance Db between the force sensor 262b and the location 222b on the surface of the breast 254 directly below the breast 254. Thus, the vertical thickness of the breast 254 at location 222b may be determined by subtracting from the distance Db from the distance S.

If a force sensor 262 is substantially aligned with a central portion (typically the thickest compressed portion) of the breast (e.g., force sensor 262a), the determination of the thickness of the breast is relatively straightforward. However, if only a single force sensor is used, and the thickest compressed portion of the breast is not aligned with that force sensor, calculation of the thickest compressed portion will be challenging. As such, it may be advantageous to arrange a plurality of the force sensors 262 linearly proximate to a front wall of the foam compressive element 202, such as depicted in FIG. 2D. Further, arrangement of a plurality of parallel rows of force sensors (e.g., a grid, such as depicted in FIG. 2C), will enable a determination of a compressed thickness of the foam compressive element. By extension, an entire upper compressed profile of the breast may be determined, along with the thickness of the compressed breast at various locations thereon. Thus, while a skilled technologist may be able to properly center the thickest portion of the breast along the centerline 220 (with a plurality of force sensors 262a arranged thereon), multiple rows of multiple sensors may be more advantageous.

Indeed, multiple sensors 262 along a width of the breast may be desirable because signal errors may occur further from the force sensors 262 at the center of the breast. In example implementations of the technology described herein, force sensors 262 are placed on or near the upper flat surface of foam compressive element, while the foam compressive element is compressed and deformed from the bottom surface. The force measured at each sensor and the local foam thickness below each sensor has a complicated relationship. Further, the local force measured at one sensor is contributed to by multiple regions of breast below the sensor; the local compression of breast at the lower surface also contributes to force reading of multiple force sensors above it. Therefore, a convolution process may be utilized between the upper surface's force distribution and the bottom surface's local compression thickness (and the local force). The full solution of compressed foam thickness distribution utilizes a de-convolution process, which in examples may be based on one or more algorithms. However, at the center location in the cross-section view of the breast where the upper breast surface is substantially horizontal and compression thickness is locally uniform, a simple force versus thickness relationship following Hooke's law may exist. Such a relationship may be generated for each type of foam compressive element utilized, each of which may be characterized by an uncompressed thickness, a spring rate, etc. Thus, a relationship between detected force signal and thickness of the compressed foam compressive element may be contained within a look-up table which may be utilized to derive thickness at the center of breast. For other locations where breast surface shape is more curved (e.g., proximate the outer edges of the breast), a more rigorous mathematical method may be utilized to derive compressed foam thickness and compressed breast thickness.

Figure 3:
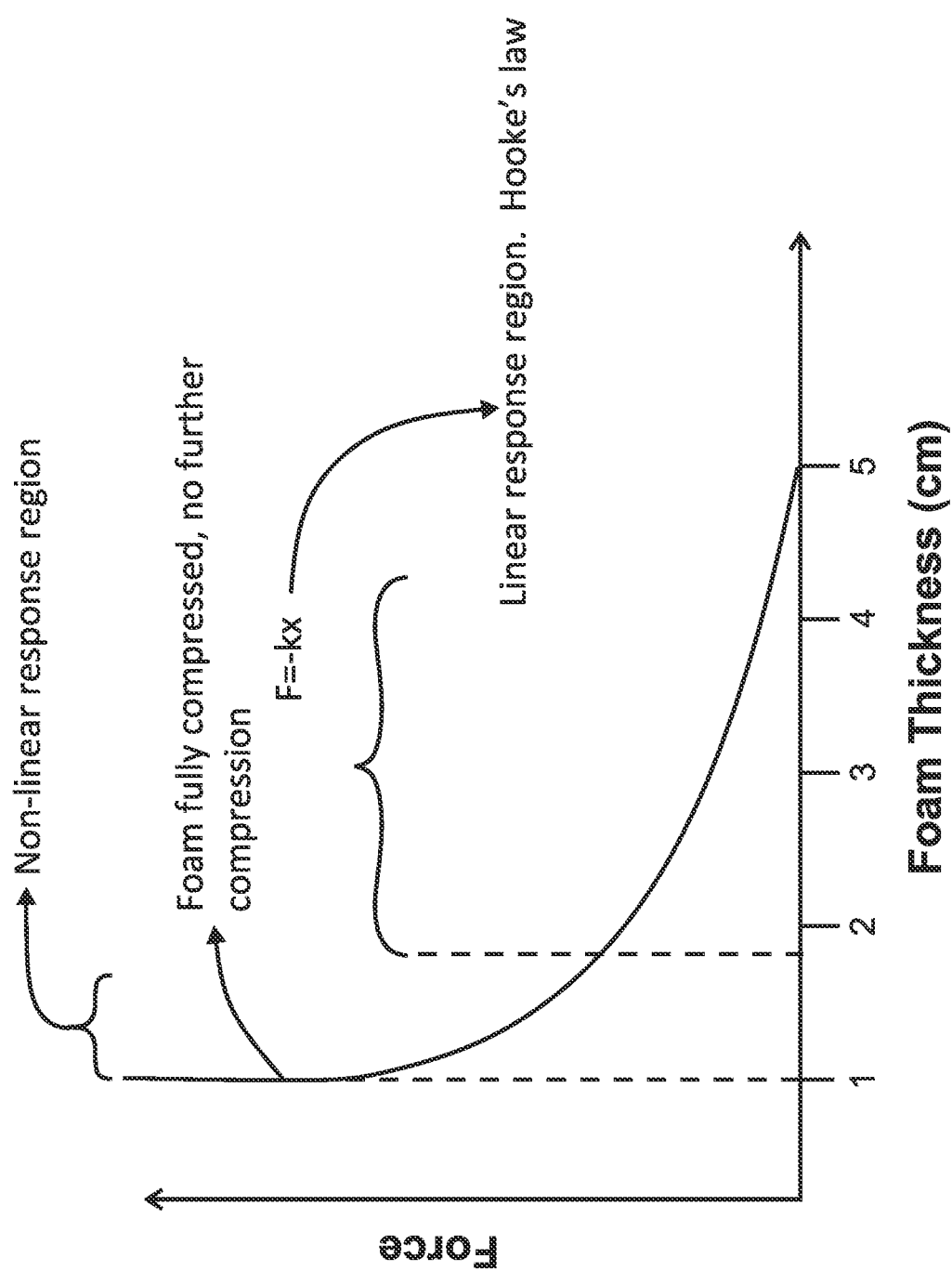
FIG. 3 depicts an example plot of force versus compressed foam thickness for a foam compressive element.

FIG. 3 depicts an example plot of force versus compressed foam thickness for a foam compressive element. This plot is particularly applicable to derive compressed foam thickness at the center of breast. It also reflects performance of an example foam at various stages of compression. Before foam is fully compressed, the force versus thickness will likely follow the Hooke's law until the thickness reaches a completely compressed condition, where no further compression of the foam compressive element is possible. Once foam is fully compressed, further increasing force will not reduce the compressed foam thickness further.

The technologies described herein also provide a method to measure breast's area size and upper surface shape or contour without using x-ray emissions. With known technologies, such information is generally obtained only from a breast image after an x-ray is taken. With a row or grid of force sensors, a force map may be generated that can be used to determine breast size, area shape, and/or skin boundary even before a first exposure is taken. This information may be used in system control and AEC determination. For example, known technologies typically cannot determine the breast size to be imaged; as such, the x-ray field is set to be fully open to irradiate the entire field of detector. The present technologies allow for a determination of breast size prior to exposure. Thus, the x-ray field can be reduced to match the breast size by moving x-ray aperture collimators, which reduce x-ray scatters to both breast and detector. This would reduce patient dose and improve image quality.

Further, one or more force sensors may be placed on the bottom surface (the breast-contacting surface) of foam or inside the foam to give accurate force or pressure measurement on breast surface. The automatic paddle compression can be set based on direct local pressure on breast instead of the overall compression force on the compression paddle. Further, in additional to compression force reported by paddle control, compression pressure on the breast may also be calculated, based on determinations of the area being contacted by the foam compressive element. This allows for an improved ability to automatically control the compression paddle, instead of relying on the force applied by the compression arm itself.

Figure 4:
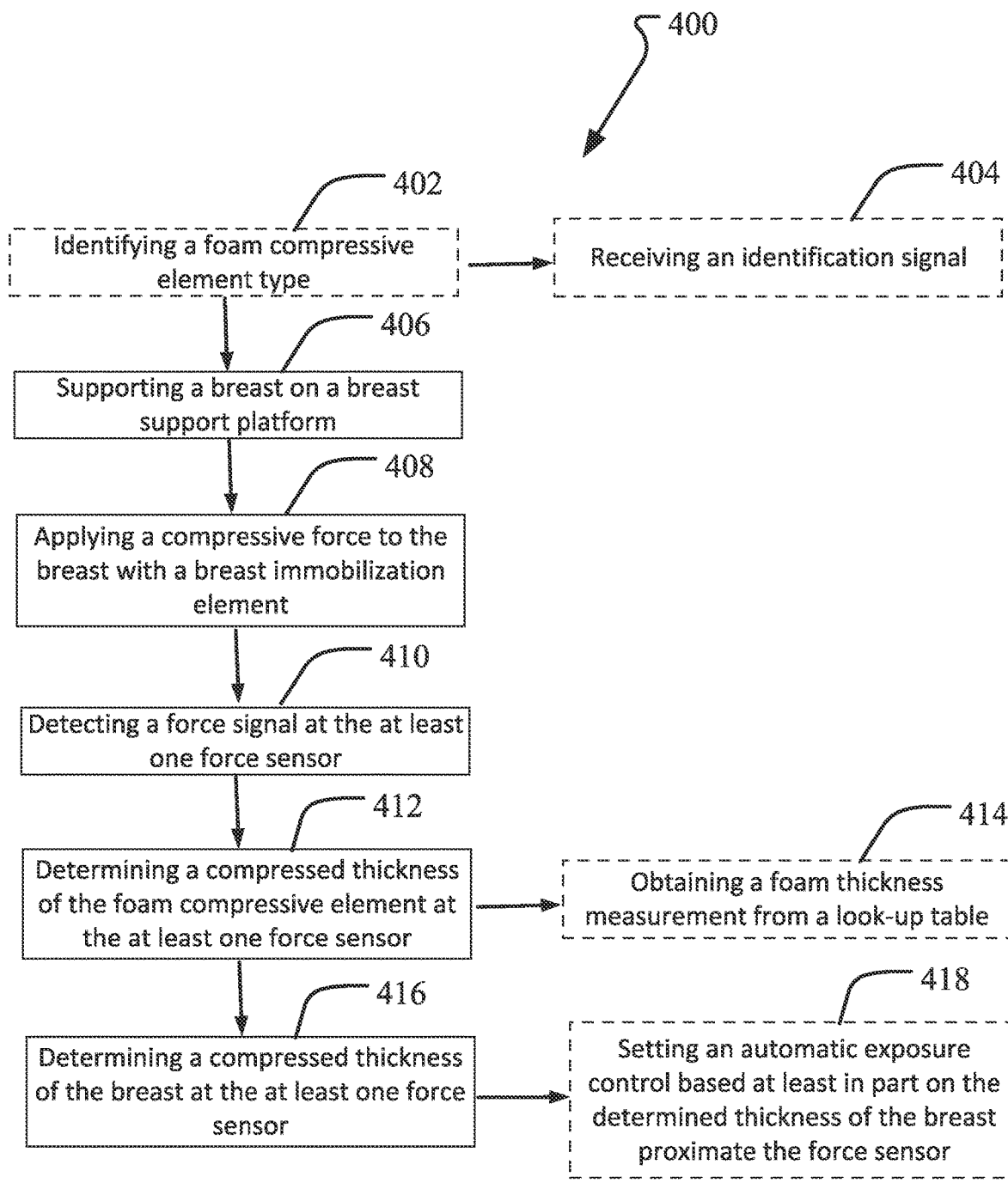
FIGS. 4 and 5 depict methods of imaging a breast of a patient with a breast imaging system.
Figure 5:
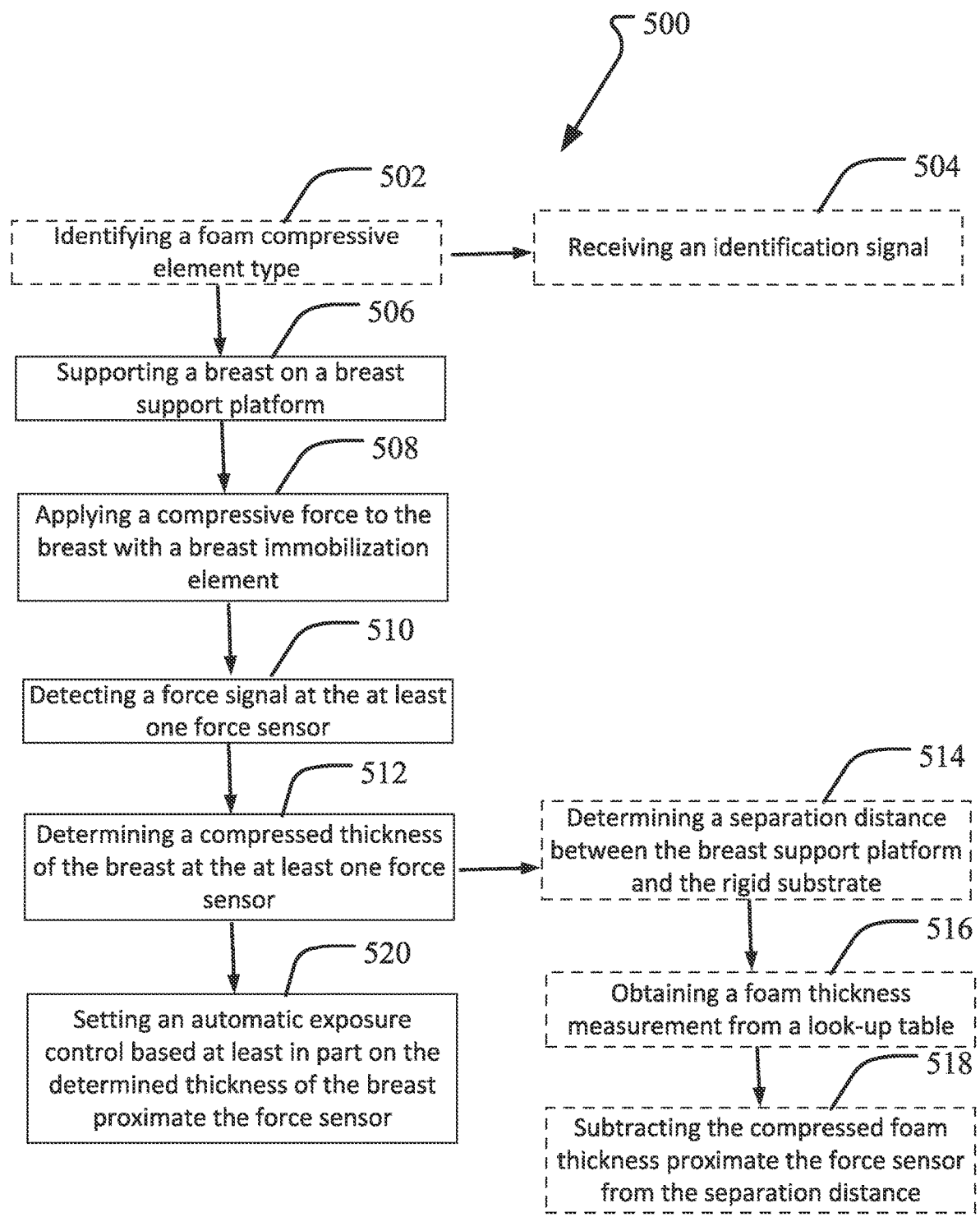

FIGS. 4 and 5 depict methods 400, 500 of imaging a breast of a patient with a breast imaging system. Beginning with FIG. 4, the method 400 may begin with operation 402, identifying a foam compressive element type. The foam compressive element type may include information such as manufacturer, material, thickness, etc. Other information such as spring rate may also be associated with the type. Further, the performance of a particular foam compressive element type (e.g., a deflection distance based on applied force, which may be contained in a look-up table) may also be provided. All of this information may be stored on a memory module of the imaging system. The foam compressive element type may be identified by a user selection (e.g., by the technologist upon selecting a particular paddle for an imaging procedure), or as depicted in operation 404, by receiving an identification signal. The identification signal may be associated with an RFID chip or bar code on the compression paddle that may be read by an associated reader on the compression arm. With the foam compressive element type known, an accurate measure of foam compressive element compression may now be determined.

The method 400 continues with operation 406, supporting a breast on a breast support platform. As the compression arm is lowered, operation 408, applying a compressive force to the breast with a breast immobilization element, is performed. Breast immobilization elements (e.g., paddles) are described herein and include generally a rigid substrate, a foam compressive element secured below the rigid substrate, and at least one force sensor. In examples, the force sensor may be a plurality of force sensors arranged in a grid pattern or in a line (e.g., along a centerline or parallel to a front wall of the foam compressive element) on the rigid substrate. During compression and immobilization, the foam compressive element is in contact with the breast.

Operation 410, detecting a force signal at the at least one force sensor, is performed during application of the compressive force. Based at least in part on the force signal, operation 412, determining a compressed thickness of the foam compressive element at the at least one force sensor is performed. Operation 414 may include obtaining a foam thickness measurement from a look-up table. The look-up table may be specific to the foam compressive element type (e.g., as determined in operation 402) and may include a plurality of force signals and a plurality of corresponding foam thickness measurements associated with each. Operation 416 is then performed, determining a compressed thickness of the breast at the at least one force sensor. This thickness may be based at least in part on determined thickness of the foam compressive element at the foam sensor and a separation distance between the breast support platform and the rigid substrate. This is depicted and described, for example, in the context of FIG. 2D. In another example, data such as force applied by the compression arm may be applied to Hooke's law or another algorithmic function, to make the appropriate determination. These operations may be performed for each force sensor, if multiple force sensors are used. Thus, the compressed thickness of the foam compressive element, as well as the calculated compressed thickness of the breast, may be determined for each location of the foam compressive element substantially vertically aligned with each force sensor. This information may also be used to determine a compressed profile of the entire upper surface of the breast. In optional operation 418, setting an automatic exposure control based at least in part on the determined thickness of the breast proximate at the at least one force sensor, is performed. This may be based at least in part on at least one of the compressed foam thickness and a foam density.

FIG. 5 depicts another method 500, that may begin with optional operation 502, identifying a foam compressive element type. Details related thereto, along with optional operation 504, receiving an identification signal, are described above. The method 500 continues with operation 506, supporting a breast on a breast support platform. As the compression arm is lowered, operation 508, applying a compressive force to the breast with a breast immobilization element, is performed. Examples of breast immobilization elements are described elsewhere herein. During compression and immobilization, the foam compressive element is in contact with the breast. Operation 510, detecting a force signal at the at least one force sensor, is performed during application of the compressive force. Based at least in part on the force signal, operation 512, determining a compressed thickness of the breast at the at least one force sensor, is performed. Optional operation 514 begins one method of determining the compressed breast thickness, and includes determining a separation distance between the breast support platform and the rigid substrate. Operation 516, obtaining a compressed foam thickness proximate the force sensor based at least in part on the detected force signal at the force sensor, is performed. The compressed foam thickness may be obtained from a look-up table, as described elsewhere herein. Operation 518, subtracting the compressed foam thickness proximate the force sensor from the separation distance, is performed to determine the compressed thickness of the breast proximate the force sensor. Returning to operation 520, setting an automatic exposure control based at least in part on the determined thickness of the breast proximate the force sensor, is performed. In examples, setting the automatic exposure control may be further based on the compressed foam thickness, a foam density, a foam spring rate, etc. This information may be available as a result of the identification operation 502 above. These operations may be performed for each force sensor, if multiple force sensors are used. Thus, the compressed thickness of the breast, as well as the determined compressed foam thickness, may be at a location of the foam compressive element substantially vertically aligned with a force sensor.

Figure 6:
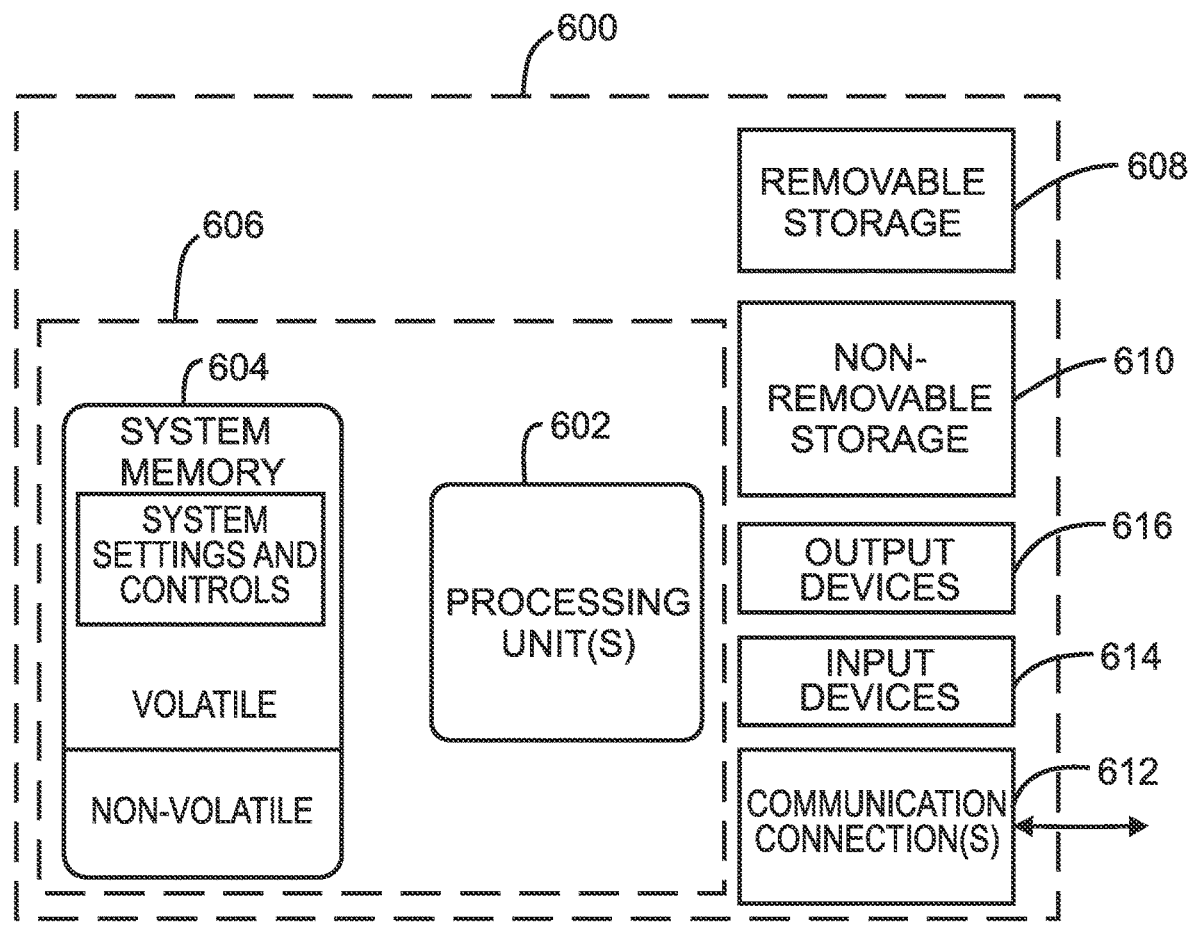
FIG. 6 depicts an example of a suitable operating environment in which one or more of the present examples can be implemented.

FIG. 6 depicts one example of a suitable operating environment 600 in which one or more of the present examples can be implemented. This operating environment may be incorporated directly into the controller for a breast imaging system, e.g., such as the controller depicted in FIG. 1. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, instructions to process force signals, calculate or determine compressed foam and/or thickness, setting of AEC does, image the breast, or perform other methods disclosed herein) can be volatile (such as RAM), non-volatile (such as ROM, flash memory, etc.), or some combination of the two. This most basic configuration is illustrated in FIG. 6 by dashed line 606. Further, environment 600 can also include storage devices (removable, 608, and/or non-removable, 610) including, but not limited to, magnetic or optical disks or tape. Similarly, environment 600 can also have input device(s) 614 such as touch screens, keyboard, mouse, pen, voice input, etc., and/or output device (s) 616 such as a display, speakers, printer, etc. Also included in the environment can be one or more communication connections 612, such as LAN, WAN, point to point, Bluetooth, RF, etc.

Operating environment 600 typically includes at least some form of computer readable media. Computer readable media can be any available media that can be accessed by processing unit 602 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 600 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by computer system 600 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 600 is part of a network that stores data in remote storage media for use by the computer system 600.

EXAMPLES

Illustrative examples of the systems and methods described herein are provided below. An embodiment of the system or method described herein may include any one or more, and any combination of, the clauses described below:

Clause 1. A method of imaging a breast of a patient with a breast imaging system, the method comprising: supporting a breast on a breast support platform; applying a compressive force to the breast with a breast immobilization element comprising a rigid substrate, a foam compressive element secured below the rigid substrate, and at least one force sensor, and wherein the foam compressive element is in contact with the breast during application of the compressive force; during application of the compressive force, detecting a force signal at the at least one force sensor; determining a compressed thickness of the foam compressive element at the at least one force sensor, based at least in part on the force signal; and determining a compressed thickness of the breast at the at least one force sensor.

Clause 2. The method of clause 1, wherein the at least one force sensor comprises a plurality of force sensors arranged in a grid pattern on the rigid substrate.

Clause 3. The method of any of clauses 1-2, wherein the at least one force sensor comprises a plurality of force sensors disposed along a line extending from a front edge of the breast immobilization element.

Clause 4. The method of clause 3, wherein the line is disposed along a central region of the rigid substrate.

Clause 5. The method of any of clauses 1-4, wherein determining the compressed thickness of the foam compressive element at the at least one force sensor comprises obtaining a foam thickness measurement from a look-up table comprising a plurality of force signals and a plurality of corresponding foam thickness measurements.

Clause 6. The method of clause 5, wherein the method further comprises identifying a foam compressive element type, and wherein the look-up table is associated with the foam compressive element type.

Clause 7. The method of clause 6, wherein identifying the foam compressive element type comprises receiving an identification signal.

Clause 8. The method of any of clauses 1-7, wherein determining the compressed thickness of the breast is based at least in part on the determined thickness of the foam compressive element at the foam sensor and a separation distance between the breast support platform and the rigid substrate.

Clause 9. The method of any of clauses 1-8, wherein the compressed thickness of the foam compressive element is at a location of the foam compressive element substantially vertically aligned with the at least one force sensor.

Clause 10. The method of any of clauses 1-9, wherein the at least one force sensor is disposed between the rigid substrate and the foam compressive element.

Clause 11. The method of any of clauses 1-10, wherein the at least one force sensor is disposed within the foam compressive element.

Clause 12. The method of any of clauses 1-11, further comprising setting an automatic exposure control based at least in part on the determined thickness of the breast proximate at the at least one force sensor.

Clause 13. The method of clause 12, wherein setting the automatic exposure control is further based at least in part on at least one of the compressed foam thickness and a foam density.

Clause 14. A method of imaging a breast of a patient with a breast imaging system, the method comprising: supporting the breast on a breast support platform; applying a compressive force to the breast with a breast immobilization element comprising a rigid substrate, a foam compressive element secured below the rigid substrate, and a force sensor, and wherein the foam compressive element is in contact with the breast during application of the compressive force; detecting a force signal at the force sensor based on the applied compressive force; determining a compressed thickness of the breast proximate the force sensor based at least in part on the detected force signal at the force sensor; and setting an automatic exposure control based at least in part on the determined thickness of the breast proximate the force sensor.

Clause 15. The method of clause 14, wherein determining the compressed thickness of the breast proximate the force sensor comprises: determining a separation distance between the breast support platform and the rigid substrate; obtaining a compressed foam thickness proximate the force sensor based at least in part on the detected force signal at the force sensor; and subtracting the compressed foam thickness proximate the force sensor from the separation distance to determine the compressed thickness of the breast proximate the force sensor.

Clause 16. The method of any of clauses 14-15, wherein the force sensor is disposed proximate a front wall of the rigid substrate and proximate a centerline extending from the front wall.

Clause 17. The method of clause 15, wherein setting the automatic exposure control is further based at least in part on at least one of the compressed foam thickness and a foam density.

Clause 18. The method of any of clauses 14-17, wherein the force sensor comprises a plurality of force sensors.

Clause 19. The method of clause 18, wherein the plurality of force sensors are arranged in a grid pattern on the rigid substrate.

Clause 20. The method of clause 18, wherein the plurality of force sensors are arranged disposed along a centerline extending from a front wall of the rigid substrate.

Clause 21. The method of clause 15, wherein the compressed foam thickness proximate the force sensor, the compressed thickness of the breast proximate the force sensor are substantially vertically aligned.

Clause 22. The method of clause 21, wherein the compressed foam thickness proximate the force sensor, the compressed thickness of the breast proximate the force sensor, and the force sensor are substantially vertically aligned.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method of imaging a breast of a patient with a breast imaging system, the method comprising:
   supporting the breast on a breast support platform;
   applying a compressive force to the breast with a breast immobilization element comprising a rigid substrate, a foam compressive element secured below the rigid substrate, and a force sensor, and wherein the foam compressive element is in contact with the breast during application of the compressive force;
   detecting a force signal at the force sensor based on the applied compressive force;
   determining a compressed thickness of the breast proximate the force sensor based at least in part on the detected force signal at the force sensor; and
   setting an automatic exposure control based at least in part on the determined thickness of the breast proximate the force sensor.

2. The method of claim 1, wherein determining the compressed thickness of the breast proximate the force sensor comprises:
   determining a separation distance between the breast support platform and the rigid substrate;
   obtaining a compressed foam thickness proximate the force sensor based at least in part on the detected force signal at the force sensor; and
   subtracting the compressed foam thickness proximate the force sensor from the separation distance to determine the compressed thickness of the breast proximate the force sensor.

3. The method of claim 1, wherein the force sensor is disposed proximate a front wall of the rigid substrate and proximate a centerline extending from the front wall.

4. The method of claim 1, wherein setting the automatic exposure control is further based at least in part on at least one of the compressed foam thickness and a foam density.

5. The method of claim 1, wherein the force sensor comprises a plurality of force sensors.

6. The method of claim 5, wherein the plurality of force sensors are arranged in a grid pattern on the rigid substrate.

7. The method of claim 5, wherein the plurality of force sensors are arranged disposed along a centerline extending from a front wall of the rigid substrate.

8. The method of claim 2, wherein the compressed foam thickness proximate the force sensor, and the compressed thickness of the breast proximate the force sensor are substantially vertically aligned.

9. The method of claim 8, wherein the compressed foam thickness proximate the force sensor, the compressed thickness of the breast proximate the force sensor, and the force sensor are substantially vertically aligned.

10. The method of claim 1, wherein the force sensor comprises a plurality of force sensors disposed along a line extending from a front edge of the breast immobilization element.

11. The method of claim 10, wherein the line is disposed along a central region of the rigid substrate.

12. The method claim 1, further comprising determining the compressed thickness of the foam compressive element.

13. The method of claim 12, wherein determining the compressed thickness of the foam compressive element at the force sensor comprises obtaining a foam thickness measurement from a look-up table comprising a plurality of force signals and a plurality of corresponding foam thickness measurements.

14. The method of claim 13, wherein the method further comprises identifying a foam compressive element type, and wherein the look-up table is associated with the foam compressive element type.

15. The method of claim 14, wherein identifying the foam compressive element type comprises receiving an identification signal.

16. The method of claim 1, wherein determining the compressed thickness of the breast is based at least in part on the determined thickness of the foam compressive element at the force sensor and a separation distance between the breast support platform and the rigid substrate.

17. The method of claim 12, wherein the compressed thickness of the foam compressive element is at a location of the foam compressive element substantially vertically aligned with the force sensor.

18. The method of claim 1, wherein the force sensor is disposed between the rigid substrate and the foam compressive element.

19. The method of claim 1, wherein the force sensor is disposed within the foam compressive element.

* * * * *